Dec. 5, 1933.  B. M. COFFEE  1,938,375
BELT FASTENING CONSTRUCTION AND METHOD OF MAKING BELT CONNECTIONS
Filed Oct. 3, 1930  2 Sheets-Sheet 1

Barrett M. Coffee
INVENTOR
BY
Janney, Blair & Curtis
ATTORNEYS

Dec. 5, 1933.   B. M. COFFEE   1,938,375
BELT FASTENING CONSTRUCTION AND METHOD OF MAKING BELT CONNECTIONS
Filed Oct. 3, 1930   2 Sheets-Sheet 2

Barrett M. Coffee
INVENTOR
BY Toomey, Blair & Curtis
ATTORNEYS

Patented Dec. 5, 1933

1,938,375

UNITED STATES PATENT OFFICE 1,938,375

BELT FASTENING CONSTRUCTION AND METHOD OF MAKING BELT CONNECTIONS

Bassett M. Coffee, New Haven, Conn., assignor to The Safety Car Heating & Lighting Company, a corporation of New Jersey Application October 3, 1930. Serial No. 486,124

4 Claims. (Cl. 218—19)

This invention relates to belt connections and an art of and apparatus for making connections between belt ends.

One of the objects of this invention is to provide a method for connecting belts which shall be time-saving, require a minimum amount of labor and which may be readily and inexpensively carried on in practice. Another object is to provide a method of the above nature which will insure a firm, strong and efficient connection between the belt ends and particularly between the belt fastening devices and the belt ends. Another object is to provide a method of the above nature which will permit the effective use of belt connecting plates of simple design and ready manufacture. Another object is to provide a method for connecting belts which may be carried on quickly and conveniently in cramped quarters where cumbersome tools or the like cannot be used. Another object is to provide a method of securing belt ends together and belt fastening devices to a belt end so that a uniform distribution of the load to which the belt is subjected may be achieved and maintained. Another object of this invention is to provide a simple and thoroughly practical appliance for facilitating the making of belt connections. Another object is to provide a device of the above nature which shall be of simple and inexpensive construction while readily portable. Another object is to provide a device of the above nature which shall be easy to handle and convenient in application. Other objects will be in part obvious and in part pointed out hereinafter.

The invention accordingly consists in the combinations of elements, features of construction, arrangement of parts, and in the relation and sequence of steps as will be exemplified in the art and construction to be hereinafter described, and the scope of the application of which will be indicated in the appended claims.

Figure 1:
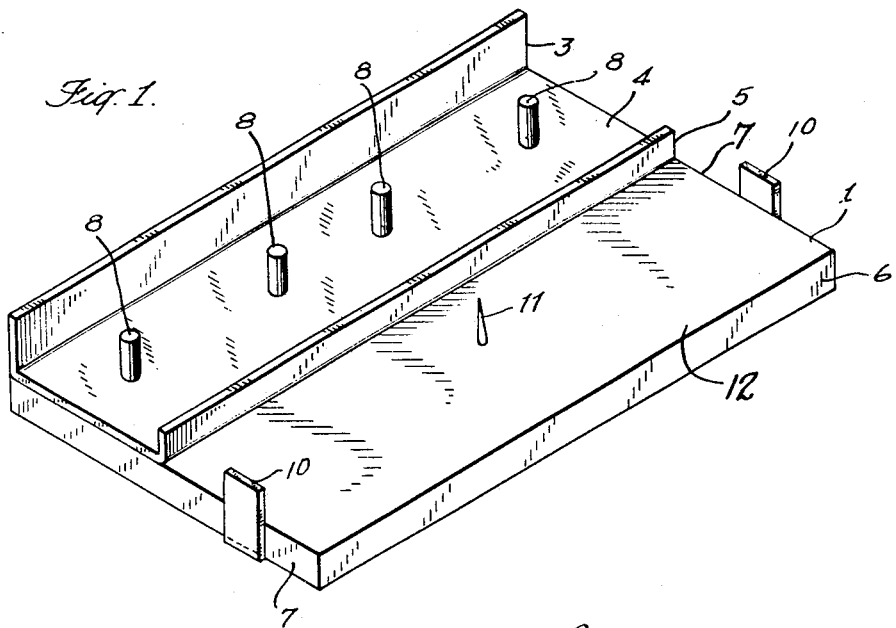
Figure 2:
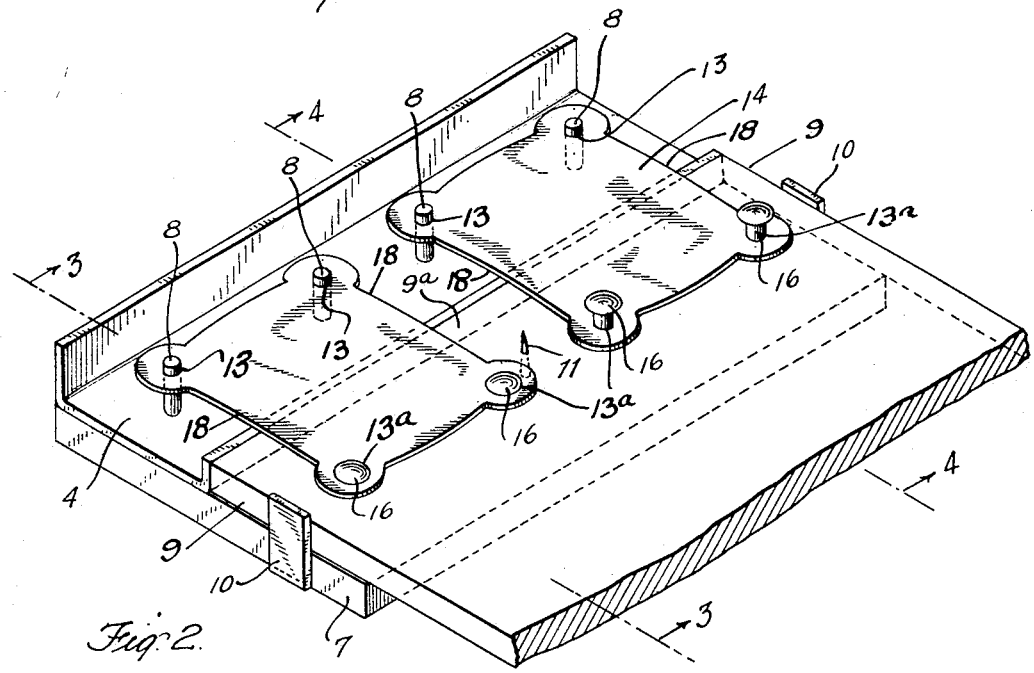
Figure 3:
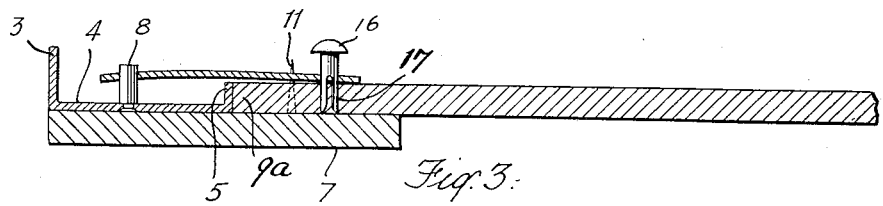
Figure 4:
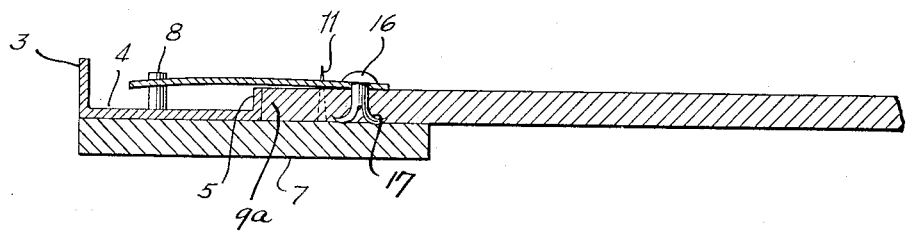
Figure 5:
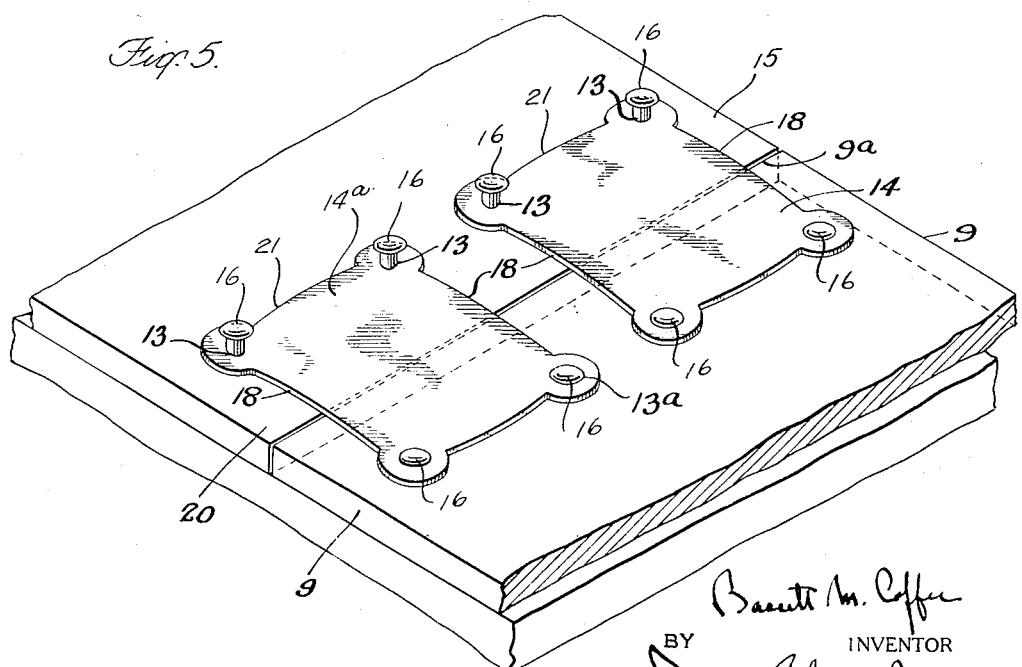

In the accompanying drawings, in which is shown one of the possible embodiments of certain mechanical features of this invention, Fig. 1 is a perspective view of an appliance for facilitating the making of belt connections, Fig. 2 is a perspective view illustrating one or more steps of my method, Fig. 3 is a vertical cross-sectional view as seen along the line 4—4 of Fig. 2, Fig. 4 is a cross-sectional view as seen along the line 3—3 of Fig. 2, and Fig. 5 is a perspective view illustrating one or more further steps of my method.

Similar reference characters refer to similar parts throughout the several views of the drawings.

As conducive to a clearer understanding of this invention, it may at this point be briefly stated that, in attaching the opposite ends of a driving belt, the connection should be such that a uniform distribution of the load throughout the entire cross section of the belt be assured. A common defect in the making of belt connections resides in the misalignment of the connected portions, oftentimes of such a character that the belt ends meet and are secured on an angle to each other. Such a connection is obviously weak for the greater part of the load on the belt is then borne by what is in fact the shorter side of the belt. Consequently overstraining results when the belt is in use, and that portion of the belt end which was formerly snug works loose from the connecting device or devices, resulting in great weakness and ultimate failure of the belt. This invention aims to provide a simple and practical construction and method of overcoming these difficulties and of providing a square and true connection.

Referring now to the drawings in detail and more particularly to Fig. 1, there is shown a flat metal base or anvil 1 which is adapted to receive a belt end. Mounted on the upper flat surface 12 of the anvil 1 is a sheet metal member 3 whose end nearest the center of the anvil is bent at right angles to its base 4 to form a straight edge 5. This metallic member 3 may be secured to the base by any desired means such as a weld or rivets. It may be noted here that the straight edge 5 is parallel with the opposite end 6 of the anvil, so that the opposite sides 9 of the belt end will lie parallel with the sides 7 of the anvil when the squared end 9—a of the belt lies flush with the straight edge 5, as is more clearly shown in Fig. 2.

Extending upwardly from the surface of the anvil 1, and preferably through the base portion 4, is a plurality of aligned guiding or holding elements generally indicated at 8, which in the preferred construction are shown as short cylindrical shafts. These aligned guiding elements 8 are substantially parallel with the straight edge 5, and the distance therefrom is determined by the length of the belt fastening plates to be employed. It will be seen that, if plates 14 having aligned holes in their opposite ends, such as those shown in Fig. 2, be placed over the guiding elements 8, the opposite ends of these plates will be parallel with the straight edge 5 and thus the squared belt end 9—a. On the opposite side of the straight edge 5 and extending from the opposite extremities of the anvil 1 are two stopping or guiding elements 10. These stopping elements 10 project above surface 12 of the anvil 1 and as will be more clearly described hereinafter act as stops for the sides of the belt end 9 when it abuts against the straight edge 5. Substantially near the center of the same side of the anvil 1 is a short pointed projection 11.

The belt end 9—a after having been first squared off is placed on the flat surface 12 of the anvil 1. The squared end of the belt is brought in registry with the straight edge 5 and the opposite sides 9 thereof lie flush against the stopping elements 10. Pressure is applied to the belt end so that the sharp projections 11 will extend into the belt. It will be seen that in this manner a rigid temporary connection is established between the appliance and the belt end, and the belt is held in a position abutting the straight edge 5. In this manner the belt end 9—a is also aligned with the guiding elements 8. As is often the case belt connections must be made in cramped quarters, for example, underneath a car body where the belt extends about a car axle leaving little slack for making the connection. By the above method the rigid temporary connection between the belt end and the appliance facilitates working under the above mentioned conditions.

The aligned holes 13 at one end of belt fastening plate 14 are placed over the aligned guiding elements 8, the latter being spaced from the straight edge so that one half of this plate 14 will lie on the upper surface of the belt end 9—a, thus leaving the other half of this belt fastening plate to overlap the other belt end as described hereinafter. Another belt fastening plate 14—a may be interlocked with guiding elements 8 in a similar manner. Belt fastening plates of the type disclosed herein are bent slightly so that their under surfaces form a concave arc, thus facilitating the passage of the belt connection about the drums or pulleys of the driving members. It will be seen that after the aligned holes 13 of the belt fastening plates 14 and 14—a are interfitted with the guiding elements 8, the center of this arc lies directly over the straight edge 5, and thus over the abutting ends of the belt as is more clearly shown in Fig. 5. Furthermore, the sides 18 of the belt fastening plates 14 and 14—a are parallel with the sides 9 of the belt end 9—a.

Split rivets 16 are placed in the holes 13—a of the belt fastening plates 14 and 14—a and forced through the belt end 9—a. On coming in contact with the flat surface 12 of the anvil 1 the split ends 17 of the rivets (Figs. 3 and 4) spread in opposite directions to form a securing element for the belt fastening plates, as more clearly shown in Figs. 3 and 4. Thus it will be seen that all of the rivets are equidistant from the straight edge 5, for an explained above, the parallel guiding elements 8 insure that the holes 13—a of these belt fastening plates are also parallel with the straight edge 5.

When a load is applied to the plates after the belt connection is completed, there will be an equal strain on all the rivets, and the total force applied to the belt will be divided equally throughout the entire belt connection. Furthermore, the sides 18 of the belt fastening plates 14 and 14—a will be substantially parallel with the sides 9 of the belt end 9—a. Thus the slight arc of these belt fastening plates will correspond with the periphery of the drums or pulleys to which the belt is applied.

The connecting appliance is now removed and a flat surfaced anvil, or the opposite face of the flat anvil 1, as is more convenient, is placed under the belt end 9 so that part of its surface extends beyond this belt end. As most clearly shown in Fig. 5, the opposite squared end 20 of the belt is then placed on this flat surface under the projecting portions 21 of the belt fastening plates 14 and 14—a. Split rivets are then placed in the holes 13 of the portions 21 of the belt fastening plates 14 and 14—a extending over the belt end 15 and lying on the flat surface of this belt end. As described above the opposite sides of these rivets split to form securing elements similar to those applied to the opposite side of these belt fastening plates.

It will be readily understood that it is usually not necessary to have a guiding appliance such as the one above disclosed for this operation, because one of the ends of the belt fastening plates 14 and 14—a has been secured to the belt end 9—a in such a manner that the holes 13 are parallel and equidistant therefrom. For this reason it is a simple matter to bring the opposite end of the belt in substantial registry with the belt end 9—a and secure the same to the belt plates to form a rigid and true connection. It will be seen that this invention is not limited to the use of two belt fastening plates for a belt connection, as any number of plates of any size might be used by varying the size of the belt fastening appliance.

It will thus be seen that there has been provided by this invention a method and appliance for making a belt connection that is firm and dependable, and which, because of its equidistance and properly aligned securing elements, distributes the load transmitted by the belt uniformly throughout the entire breadth of the belt connection.

As many possible embodiments might be made in this invention, and as many steps might be made in the embodiment above set forth or in the steps hereinbefore set forth, it is to be understood that all matter hereinabove described or set forth in the accompanying drawings is to be interpreted as illustrative and not in a limiting sense.

I claim:

1. In a device for fastening belts, in combination, a plate having one of its sides bent upwardly at right angles to form a straight edge adapted to have a belt end abut thereagainst, and a plurality of aligned projections extending from said plate opposite said straight edge and parallel therewith for positioning a belt-fastening plate relative to said belt.

2. In a device for fastening belts, in combination, a base member having a flat surface, a plate secured to said surface, one of the sides of said plate forming a straight edge adapted to have the end of a belt lying upon said surface abut thereagainst, and a plurality of elements extending from said plate on one side of said straight edge for positioning a belt fastening plate in a predetermined position with respect to said straight edge.

3. In a device for fastening belts, in combination, a base member having a flat surface, a plate secured to said base member and forming a straight edge for a belt end lying on the exposed portion of said surface, and a plurality of lugs extending from said plate and adapted to fit within the holes of fastening plates, said lugs being adapted to position the holes in the opposite ends of said fastening plates at predetermined points over said belt end.

4. In a device for fastening belts, in combination, a base member having a flat surface, a plate secured to said base member and forming a straight edge for a belt end lying on the exposed portion of said surface, a plurality of lugs extending from said plate and adapted to fit within the holes of fastening plates, said lugs being adapted to position the holes in the opposite ends of said fastening plates at predetermined points over said belt end, and elements extending from the sides of said base member adjoining said exposed surface.

BASSETT M. COFFEE.